United States Patent
Boeing et al.

(10) Patent No.: US 8,585,292 B2
(45) Date of Patent: Nov. 19, 2013

(54) RADIALLY ADJUSTABLE SHAFT BEARING ASSEMBLY

(75) Inventors: Georg Boeing, Rottenburg (DE); Wolfgang Schnurr, Nehren (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 13/508,177

(22) PCT Filed: Nov. 4, 2010

(86) PCT No.: PCT/EP2010/066794
§ 371 (c)(1),
(2), (4) Date: May 4, 2012

(87) PCT Pub. No.: WO2011/054898
PCT Pub. Date: May 12, 2011

(65) Prior Publication Data
US 2012/0219244 A1   Aug. 30, 2012

(30) Foreign Application Priority Data
Nov. 7, 2009   (DE) .................... 10 2009 052 352

(51) Int. Cl.
*F16C 23/02* (2006.01)
*F16H 35/06* (2006.01)

(52) U.S. Cl.
USPC ............................................ 384/260; 74/396

(58) Field of Classification Search
USPC ............ 384/519, 583, 256–260; 74/395, 396, 74/409, 406
See application file for complete search history.

(56) References Cited

U.S. PATENT DOCUMENTS

| 2,691,307 A | * | 10/1954 | Pillsbury | 384/255 |
| 2,691,553 A | | 10/1954 | Pettigrew | |
| 2,994,568 A | * | 8/1961 | Downs | 384/519 |
| 3,463,030 A | * | 8/1969 | Nuccel | 74/396 |
| 3,664,717 A | * | 5/1972 | Pendergrass et al. | 384/519 |
| 3,888,134 A | | 6/1975 | Miranda | |
| 4,843,904 A | * | 7/1989 | Moore | 74/396 |

FOREIGN PATENT DOCUMENTS

| CH | 135292 A | 9/1929 |
| CN | 2890507 | 4/2007 |
| DE | 7838064 U1 | 4/1979 |
| DE | 3324811 A1 | 1/1985 |
| DE | 19952869 A1 | 5/2001 |
| DE | 10116290 C1 | 12/2002 |
| EP | 1098097 | 10/2000 |
| FR | 536321 A | 4/1922 |
| FR | 1270753 A | 9/1961 |
| FR | 2621667 A1 | 4/1989 |
| JP | 8021517 A | 1/1996 |
| JP | 2000230545 A | 8/2000 |
| JP | 2004301265 A | 10/2004 |

* cited by examiner

*Primary Examiner* — Thomas R Hannon
(74) *Attorney, Agent, or Firm* — Henry M. Feiereisen LLC

(57) ABSTRACT

The invention relates to a shaft bearing assembly (1), comprising a machine part (2), in which a shaft (5) is rotatably mounted on two axially spaced bearing points (6, 7), wherein the first bearing point (6) is arranged in a stationary manner and the second bearing point (7) can be moved relative to the first bearing point (6) such that a movement of the second bearing point (7) causes a pivoting of the shaft (5) about a rotational axis (8) in the region of the first bearing point (6).

12 Claims, 6 Drawing Sheets

RADIALLY ADJUSTABLE SHAFT BEARING ASSEMBLY

CROSS-REFERENCES TO RELATED APPLICATIONS

This application is the U.S. National Stage of International Application No. PCT/EP2010/066794, filed Nov. 4, 2010, which designated the United States and has been published as International Publication No. WO 2011/054898 and which claims the priority of German Patent Application, Serial No. 10 2009 052 352.9, filed Nov. 7, 2009, pursuant to 35 U.S.C. 119(a)-(d).

BACKGROUND OF THE INVENTION

The invention relates to a shaft bearing assembly having a machine part in which a shaft is rotatably mounted at two axially spaced-apart bearing points.

A shaft bearing assembly of said type is known for example from EP 1 098 097 A1. The known shaft bearing assembly comprises a bearing bushing and a machine part for receiving the bearing bushing. The bearing bushing has an external lateral surface, an internal bore arranged eccentrically in relation to the lateral surface, and a flange projecting beyond the lateral surface. Arranged in the flange on a circle which is concentric with the lateral surface are bores for receiving fixing bolts which engage in bores disposed on an equally large circle in the machine part. The eccentricity of the internal bore of the bearing bushing is asymmetrical in at least one plane with respect to the lateral surface of the bearing bushing or with respect to the circle of the bores in the machine part having two planes of symmetry standing perpendicular to each other. The center point of the internal bore lies outside the two axes of symmetry of the lateral surface or of the circle of the bores.

The aim of this arrangement is to be able to adjust the axis of rotation of a shaft so that for example the tooth flank play between two gearwheels can be adjusted. With the known arrangement, however, said adjustment is only possible in stages. Furthermore, provision is made only for parallel displacement of the axis of rotation of the shaft, which means that an adjustment has to be made at both bearing points of the shaft.

CH 135 292 A and CN 2890507 Y each disclose a shaft bearing assembly in which a shaft connected to a gearwheel is rotatably mounted at two axially spaced-apart bearing points. In this case a first bearing point is arranged so as to remain fixed, while the second bearing point can be displaced relative to the first bearing point parallel to a common shaft bearing plane. The shaft can be pivoted about an axis of rotation in the region of the first bearing point by means of a parallel displacement of the second bearing point. This enables a tooth flank play to be set between the gearwheel connected to the shaft and a further gearwheel.

SUMMARY OF THE INVENTION

The object of the present invention is accordingly to provide a shaft bearing assembly which is simple in design and can be constructed at reasonable cost and which enables easy adjustment of the axis of rotation of a shaft.

This object is achieved according to the invention by means of a shaft bearing assembly of the type cited in the introduction, wherein a first bearing point is arranged so as to remain fixed and a second bearing point can be displaced relative to the first bearing point in such a way that a displacement of the second bearing point causes the shaft to pivot about an axis of rotation in the region of the first bearing point. This takes advantage of the knowledge that bearing manufacturers, in particular manufacturers of roller bearings, design the bearings in such a way that a certain inclination in the position of the shaft in the shaft bearing is permitted. The underlying reason for this is that shafts often flex during use. The manufacturers of shaft bearings deliberately make allowance for this. This results in a spherical compression distribution in the bearing which can be inventively exploited, see e.g. FAG Roller Bearings, catalog WL 41 520/3DB, edition 1999, page 323.

If the shaft is a component part of a gearing mechanism, that is to say if it is embodied for example as a worm gear shaft, worm gear, spur gear or pinion drive shaft or includes such a component, the position in relation to the other gear part in each case, and consequently the tooth flank play, can be set by means of the adjustment of the shaft. For example, the shaft can be installed in an inclined position and then the tooth flank play can be set such that in its working state the shaft is disposed in a straight installation position in the machine part, e.g. parallel to a central plane of the machine part. By means of the shaft bearing assembly according to the invention it is made considerably easier to adjust the axis of rotation of the shaft than in a known shaft bearing assembly, since from now on it is only necessary to adjust one bearing point. The constructional effort involved in implementing the shaft bearing assembly is also reduced as a result.

Particular advantages are produced if the second bearing point is continuously adjustable. This enables the tooth flank play to be set with particular precision.

According to one inventive design, a shaft bearing can be provided at the first bearing point, said shaft bearing being aligned parallel to a shaft bearing plane, and a shaft bearing which is likewise aligned parallel to the shaft bearing plane and can be displaced parallel to the shaft bearing plane can be provided at the second bearing point. This means that the shaft bearing at the second bearing point simply has to perform a translational movement in order to effect an adjustment of the shaft. In particular it may be sufficient if the shaft bearing at the second bearing point performs a movement exclusively in one direction.

According to the invention the first bearing point is arranged in or on a first machine part element, and the second bearing point is arranged in or on a second machine part element, the second machine part element being displaceable relative to the first machine part element. Particular advantages are produced if the second machine part element can be displaced relative to the first machine part element along a guidance means. This measure results in a defined displacement possibility for adjusting the second machine part element and consequently the second bearing point in relation to the first machine part element or the first bearing point. The guidance means can be embodied for example such that slotted holes are provided on the second machine part element, through which slotted holes project fixing bolts which are screwed into the first machine part element. In order to adjust the second machine part element it is therefore merely necessary to loosen the fixing bolts somewhat. The second machine part element can then be moved relative to the fixing bolts in the adjustment range defined by the slotted holes. When the right adjustment position is assumed, the fixing bolts can be tightened again and in this way the second machine part element can be registered in its displaced position in relation to the first machine part element. The advantage here is that the fixing bolts do not have to be removed, as is necessary in the prior art, in order to effect an adjustment of the bearing bushing. Other types of guidance means are also conceivable, however. A guidance means, for example a guide rail or a recess, could be provided on the first machine part element, along which guidance means the second machine part element is displaceable.

According to the invention the second machine part element is displaceable relative to the first machine part element against a restoring force. By way of an appropriate arrangement of resilient means which effect the restoring force it can be ensured that the second machine part element can be moved in a predetermined direction only.

Alignment means for aligning the second machine part element in relation to the first machine part element can also be provided. By way of the alignment means it can be ensured that the second machine part is moved only in one direction. A movement in other directions should be avoided. The alignment means can act as a supporting measure for this purpose. If the second machine part element is arranged in an opening of the first machine part element, a plurality of spring-loaded elements, rubber bump stops or the like can be arranged between the machine part elements distributed over the circumference of the second machine part element and thereby act as a centering means.

According to one embodiment variant, the machine part can be embodied as a housing and sealing means can be provided between the first machine part element and the second machine part element. This can prevent dirt from penetrating into the housing and compromising the reliable operation of the shaft bearing assembly. Lubricants contained in the housing can also be prevented from escaping.

An O-ring can be arranged between the first machine part element and the second machine part element. In this case the second machine part element can be disposed at least partially in an opening of the first machine part element and the O-ring can be arranged between the two machine part elements. If the second machine part element is now displaced relative to the first machine part element, the O-ring is compressed. Radial forces are produced. The compression of the O-ring also generates a restoring force against which the second machine part element is moved. The radial forces create an equilibrium of forces and as a result cause the second machine part element to be centered in the first machine part element. if the second machine part element is moved out of this centered position, an axial inclination of the axis of the shaft is achieved. If the force that is required to move the second machine part element is directed toward the axis of symmetry, then the second machine part element will deflect in this direction only, since the forces in the orthogonal direction to the applied force are in equilibrium or impose this. The O-ring additionally acts as a sealing means between the first machine part element and the second machine part element. Thus, several functions can be covered by means of one O-ring. With this embodiment of the shaft bearing assembly, only minor requirements are imposed in terms of the manufacturing precision of the second machine part element. The O-ring can compensate for tolerances.

It is particularly advantageous if displacement means are provided for adjusting the second machine part element relative to the first machine part element. The displacement means enable a defined adjustment of the second machine part to be effected. The displacement means can for example include an eccentric. A bolt which is screwed into the first machine part element can have an eccentric bolt head which is arranged in an opening of the second machine part element. Rotating the bolt head accordingly causes the second machine part element to be displaced relative to the first machine part element.

According to the invention the second shaft bearing part includes a plurality of openings through which fixing bolts screwed into the first machine part element project, the fixing bolts being arranged with adjustment play in the openings. The adjustment play can be in the range of ²⁄₁₀ to ⁵⁄₁₀ mm. In order to adjust the second machine part element the fixing bolts can be slackened somewhat so that the second machine part element can be moved relative to the fixing bolts within the range of the adjustment play.

The new position of the second machine part element is now set and then the fixing bolts are tightened again in order to fix the second machine part element immovably to the first machine part element. This embodiment of the shaft bearing assembly has the advantage that a corrective adjustment of the position of the second bearing point is possible without dismantling the entire shaft bearing assembly. Furthermore, a small probability of assembly errors exists in comparison with prior art assemblies.

Assembly errors can also be reduced on account of the fact that the openings lie on a circle.

It is particularly advantageous if the shaft is embodied as a gear part or includes such a gear part and an associated second gear part is arranged in the machine part. With such an arrangement the tooth flank play of a gearing mechanism can be adjusted particularly easily and continuously by means of an adjustment of the inclination of the shaft.

Further features and advantages of the invention will emerge from the following detailed description of exemplary embodiments of the invention with reference to the figures of the drawing, in which details essential to the invention are shown, as well as from the claims. The features revealed there are not necessarily to be understood as true to scale and are depicted in such a way that the specific inventive aspects can be made clearly visible. The different features can be realized individually per se or in groups in arbitrary combinations in variants of the invention.

BRIEF DESCRIPTION OF THE DRAWING

Exemplary embodiments of the invention are shown in various stages of use in the schematic drawing and are explained in more detail in the following description. In the drawing.

DETAILED DESCRIPTION OF PREFERRED EMBODIMENTS

Figure 1A:
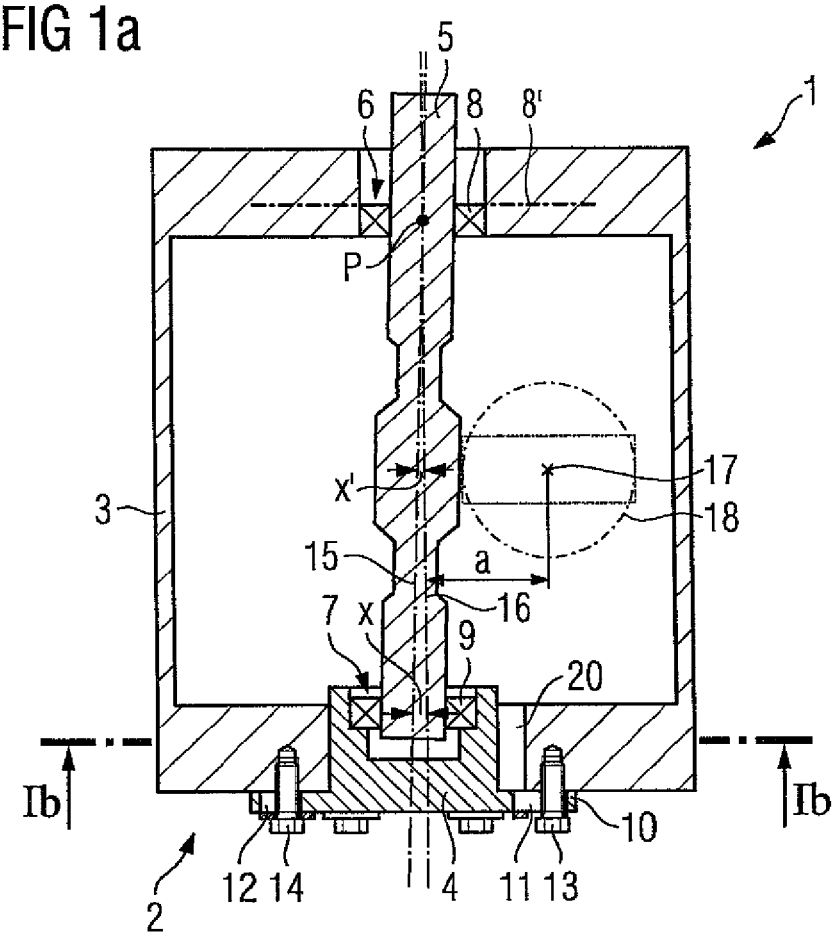
FIG. 1a shows a sectional view through a shaft bearing assembly in which the shaft is disposed in an assembly position.

FIG. 1a shows a shaft bearing assembly 1 having a machine part 2 which comprises a first machine part element 3 and a second machine part element 4. In the exemplary embodiment the machine part 2 is embodied as a housing which is composed of the machine part elements 3, 4. In the machine part 2 a shaft 5 is mounted at two bearing points 6, 7. The first bearing point 6 is arranged as fixed and includes a shaft bearing 8 which is aligned parallel to a shaft bearing plane 8'. The second bearing point 7 is arranged in the second machine part element 4 and includes a shaft bearing 9 which is likewise aligned parallel to the shaft bearing plane 8'.

The second machine part element 4 has a flange 10 in which are contained openings 11, 12. Fixing bolts 13, 14 which are screwed into the first machine part element 3 project through the openings 11, 12. The openings 11, 12 are significantly larger than the diameter of the fixing bolts 13, 14, i.e. an adjustment play is present. This means that with fixing bolts 13, 14 loosened the second machine part element 4 is continuously adjustable relative to the fixing bolts 13, 14, and consequently also relative to the first machine part element 3. In the position shown, the second machine part element 4 is located in a left-hand end position. This means that the shaft 5 has an inclination. In particular the axis of rotation 15 is inclined at an angle in relation to a center axis 16 or central plane of the shaft bearing assembly 1. Said inclination is produced because the second machine part element 4 has been displaced to the left by the distance x with respect to a centered position parallel to the shaft bearing plane 8'. This results in an axis center distance change x'. The distance of the axis of rotation 15 from an axis of rotation 17 is therefore equal to a+x'. The axis of rotation 17 is associated with a second gear part 18 which can be embodied for example as a worm gear or spur gear. The shaft 5 can accordingly be embodied as a worm gear shaft or pinion drive shaft.

Figure 1B:
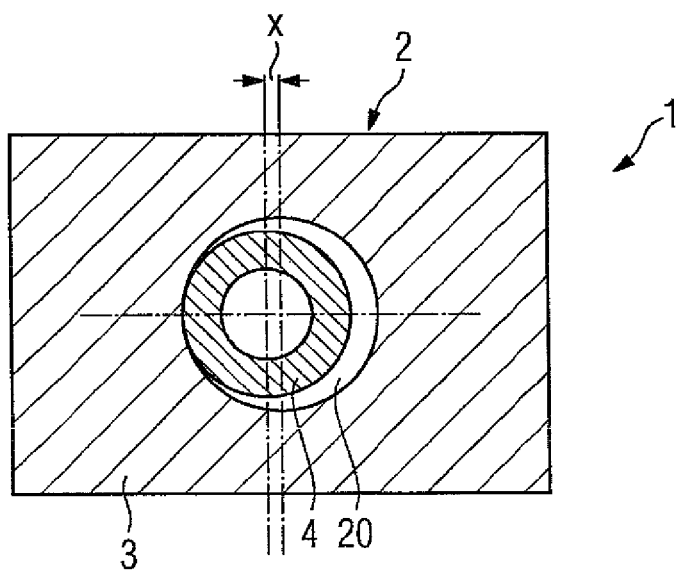
FIG. 1b shows a cross-sectional view along the line lb-lb of FIG. 1a, FIGS. 2a-b show views for a target setting of the shaft corresponding to the views of FIGS. 1a and 1b, FIGS. 3a-b show views for a play-free selling of the shaft corresponding to FIGS. 1a and 1b.

In the sectional view of FIG. 1b it can be seen that the second machine part element 4 is arranged inside the opening 20 of the first machine part element 3 in a left-hand end position, which has resulted due to a displacement by the distance x from a centered position.

Figure 2A:
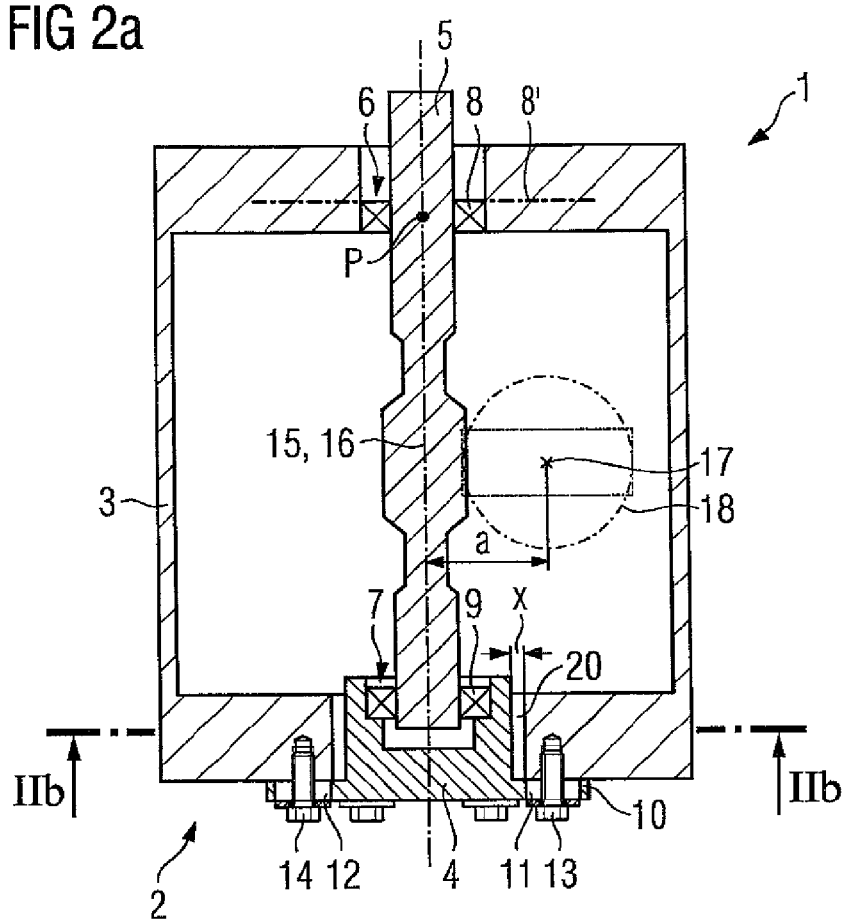

FIG. 2a shows a view corresponding to FIG. 1a. The same reference signs are used for the same components. Compared with the view shown in FIG. 1a, the second machine part element 4 is located in a centered position inside the opening 20. The result of this is that the axis of rotation 15 and the center axis 16 are now congruent, since the shaft 5 has been pivoted about the axis of rotation P standing perpendicular to the axis of rotation 15. The shaft 5 is located in a target setting in which the distance between the axes 15, 17 is equal to a. The second machine part 4 has the distance x to the boundary of the opening 20 on all sides. This is also apparent from FIG. 2b.

Figure 3A:
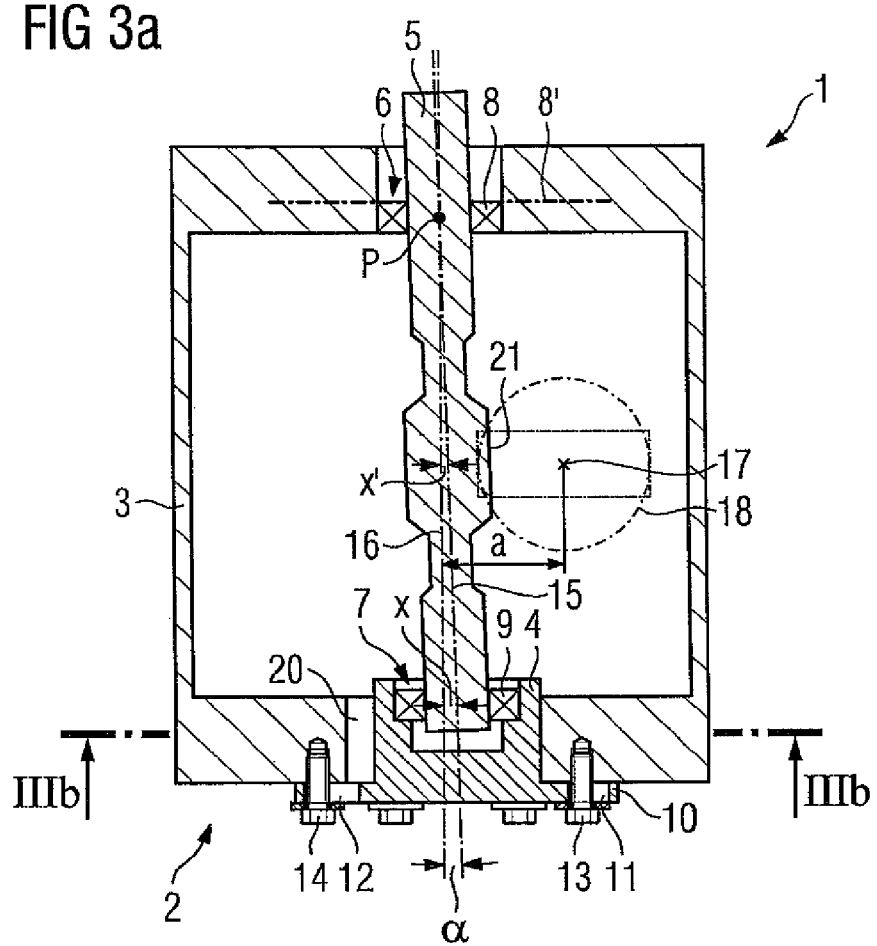

In FIG. 3a, the second machine part element 4 is located in a right-hand end position. In particular the machine part element 4 has been moved to the right by the distance x with respect to the position shown in FIG. 2a. The axis of rotation of the shaft 5 is now located at the distance a–x' from the axis of rotation 17 of the gear part 18. The gear part 18 is now in engagement with a corresponding section 21 of the shaft 5, the tooth flank play having been minimized owing to the engagement depth of the teeth having been changed. In order to reach the position according to FIG. 3a from the position according to FIG. 1a the shaft 5 has therefore been pivoted about the axis of rotation P in the region of the bearing point 6 in that only the second machine part element 4 with the bearing point 7 has been displaced transversally parallel to the shaft bearing plane 8'. This displacement is effected continuously. In the position shown in FIG. 3a, the shaft 5, and consequently its axis of rotation 15, has been pivoted through the angle a with respect to the center axis 16 of the machine part 2.

Figure 2B:
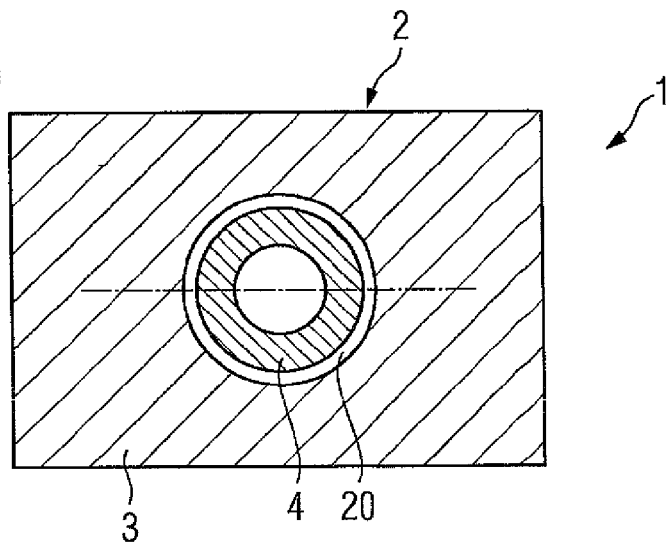
Figure 3B:
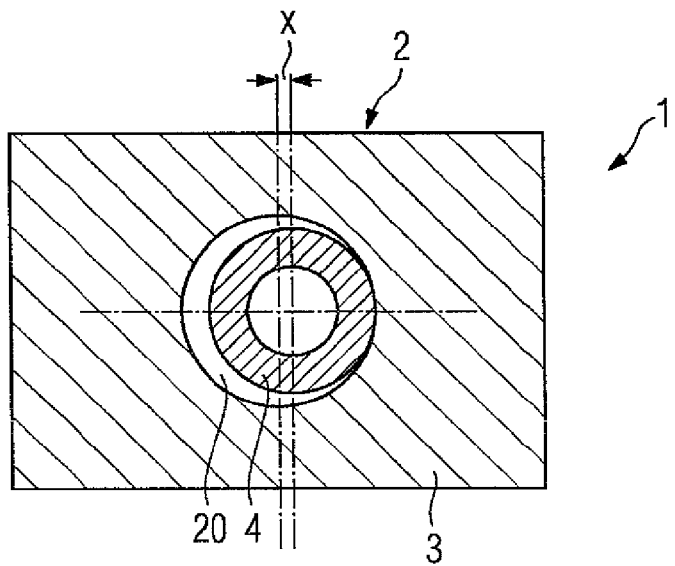

In a view corresponding to FIGS. 1b and 2b, FIG. 3b shows the position of the second machine part element 4 in relation to the first machine part element 3.

Figure 4A:
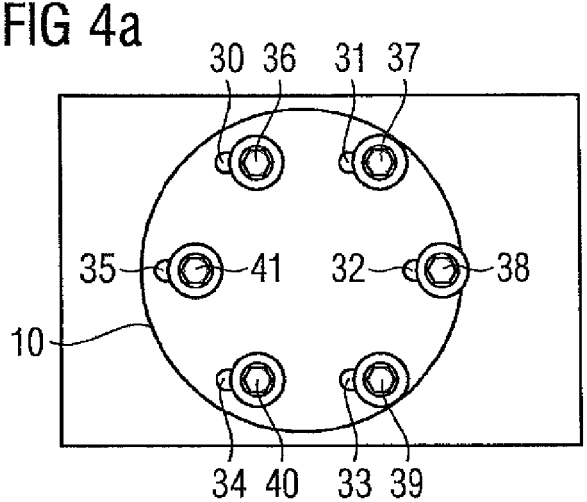
FIG. 4a shows a side view of a first embodiment variant of a shaft assembly.
Figure 4B:
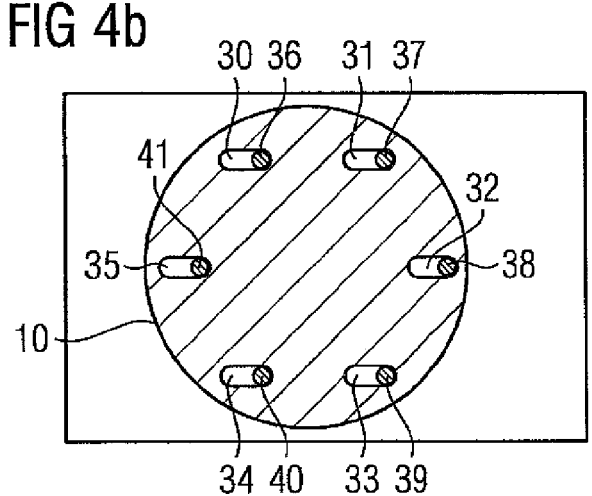
FIG. 4b shows a sectional view through a second machine part element of the shaft assembly according to FIG. 4a, FIG. 4c shows a horizontal section through a first embodiment variant of a shaft bearing assembly.
Figure 4C:
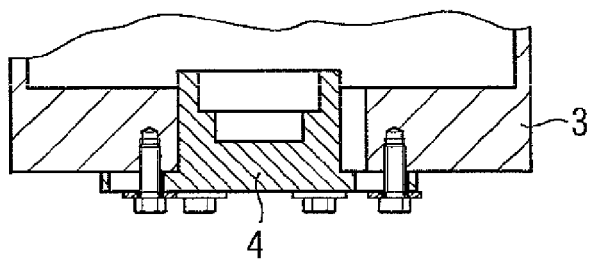

FIGS. 4a to 4c show that in a first embodiment variant the flange 10 of the second machine part element 4 has slotted holes 30-35. Fixing bolts 36-41 are inserted through the slotted holes 30-35 and bolted to the first machine part element 3. The slotted holes 30-35 constitute a guidance means along which the second machine part element 4 can be adjusted in relation to the first machine part element 3. The embodiment as slotted holes 30-35 means that a movement in one direction only is possible.

Figure 5A:
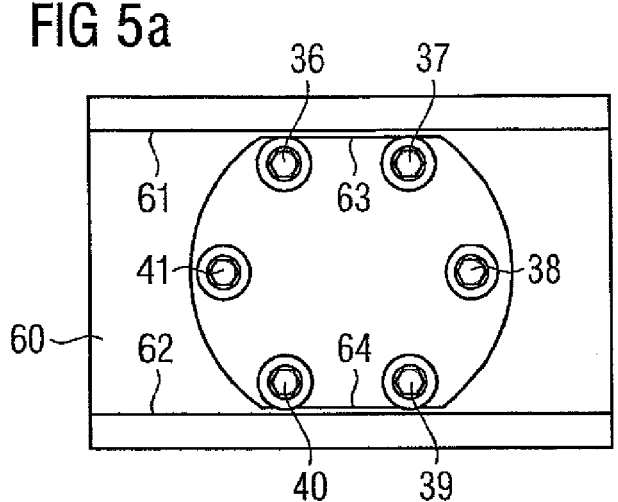
FIGS. 5a-c show views for a second embodiment variant of a shaft bearing assembly corresponding to FIGS. 4a to 4c, and FIGS. 6a-c show views for a third embodiment variant of a shaft bearing assembly corresponding to FIGS. 4a to 4c.
Figure 5B:
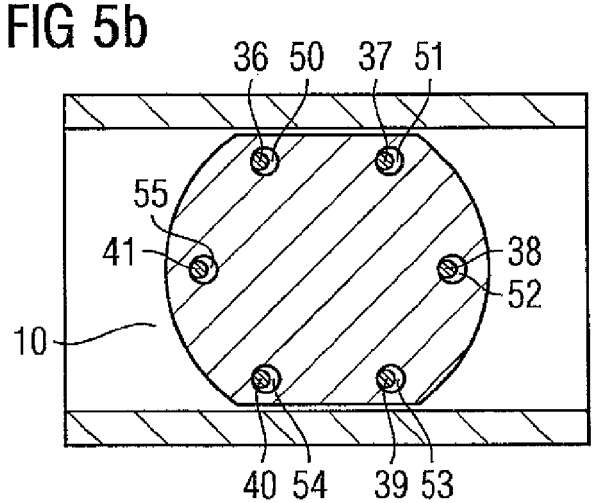
Figure 5C:
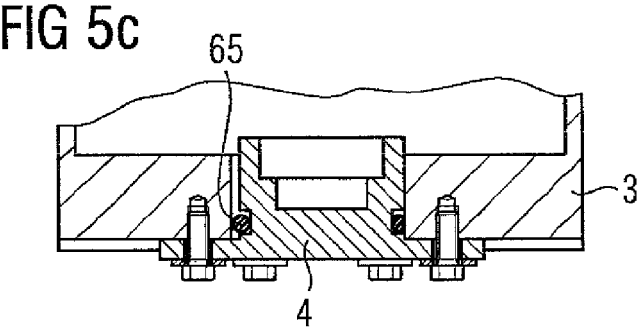

In the embodiment according to FIGS. 5a to 5c, the holes 50-55 are embodied as circular and have a clearance (adjustment play) with respect to the fixing bolts 36-41. It can be seen here that the first machine part element 3 has a cutout embodied as a recess 60 which is delimited by edges 61, 62. The second machine part element 4 is no longer embodied as circular, but has flat sections 63, 64 disposed opposite the edges 61, 62. Consequently, the machine part element 4 can likewise be moved in one direction only, since it is guided by the edges 61, 62 and the edges 61, 62 prevent a vertical movement. Accordingly, only a horizontal movement is possible. It can be seen in FIG. 5c that an O-ring 65 is arranged between the machine part element 4 and the machine part element 3, said O-ring 65 being squeezed on the right-hand side as a result of the displacement of the second machine part element 4 to the right. The adjustment consequently takes place against a restoring force. The two machine part elements 3, 4 are sealed off from each other by means of the O-ring 65. The O-ring 65 also effects an automatic centering when the machine part element 4 is not displaced by application of additional external forces.

Figure 6A:
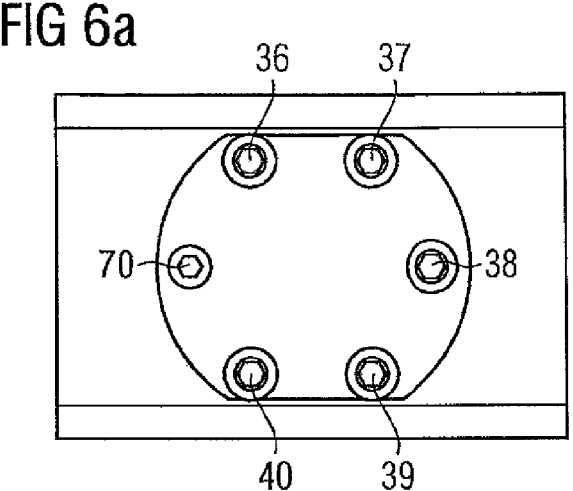
Figure 6B:
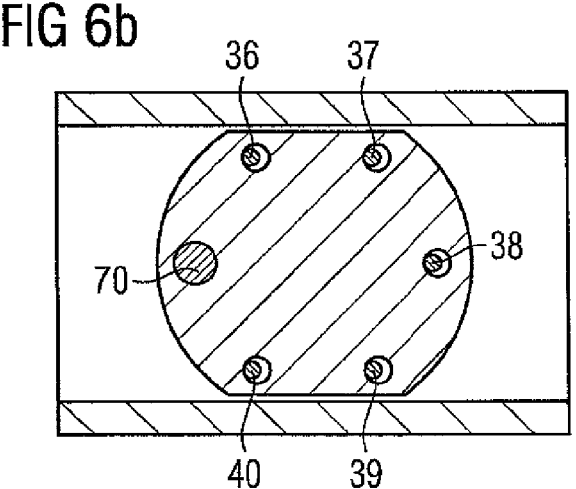
Figure 6C:
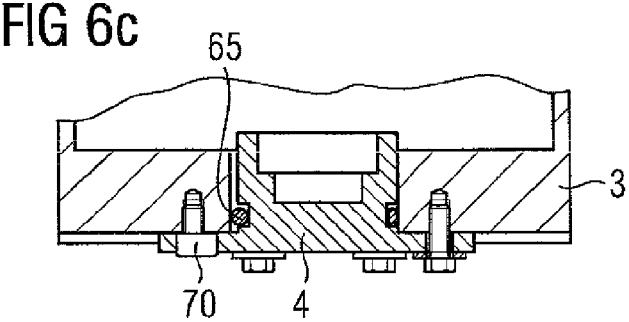

The special aspect of the embodiment according to FIGS. 6a to 6c resides in the fact that the fixing bolt 41 of the second embodiment variant according to FIG. 5b is replaced by an eccentric bolt 70. The eccentric bolt 70 can be used to adjust the machine part element 4 in relation to the machine part element 3. Accordingly, no external displacement means are required.

A recess 60 is also present in the embodiment variant according to FIGS. 6a to 6c, such that the machine part element 4 according to FIGS. 6a to 6c is likewise guided by the edges 61, 62. In this case too, therefore, a displacement of the machine part element 4 is possible only in the horizontal direction.

What is claimed is:

1. A shaft bearing assembly, comprising:
   a machine part having a first machine part element and a second machine part element, said second machine part element including a plurality of openings;
   fasteners threadably engaged in the first machine part and projecting through the openings of the second machine part, with the fasteners being arranged with adjustment play in the openings;
   a first fixed bearing point arranged in or on the first machine part element for rotatably supporting a shaft; and
   a second bearing point arranged in or on the second machine part element for rotatably supporting the shaft at a location which is spaced from the first bearing point in axial direction, said second bearing point being adjustable relative to the first bearing point in opposition to a restoring force for pivoting the shaft about an axis of rotation in a region of the first bearing point.

2. The shaft bearing assembly of claim 1, wherein the fasteners are fixing bolts.

3. The shaft bearing assembly of claim 1, wherein the second bearing point is configured for continuous adjustment.

4. The shaft bearing assembly of claim 1, wherein the first bearing point includes a shaft bearing which is aligned parallel to a shaft bearing plane, and the second bearing point includes a shaft bearing which is aligned parallel to the shaft bearing plane and adjustable parallel to the shaft bearing plane.

5. The shaft bearing assembly of claim 1, wherein the second machine part element is adjustable relative to the first machine part element along a guidance.

6. The shaft bearing assembly of claim 1, further comprising an alignment mechanism for aligning the second machine part element in relation to the first machine part element.

7. The shaft bearing assembly of claim 1, wherein the machine part is embodied as a housing, and further comprising a seal provided between the first machine part element and the second machine part element.

8. The shaft bearing assembly of claim 7, wherein the seal is an O-ring.

9. The shaft bearing assembly of claim 1, further comprising a displacement mechanism for displacing the second machine part element relative to the first machine part element.

10. The shaft bearing assembly of claim 9, wherein the displacement mechanism includes an eccentric.

11. The shaft bearing assembly of claim 1, wherein the openings lie on a circle.

12. The shaft bearing assembly of claim 1, wherein the shaft is embodied as a first gear part or includes such a first gear part, with a second gear part being arranged in the machine part and interacting with the first gear part.

* * * * *